(12) United States Patent
Applebaum

(10) Patent No.: US 9,254,781 B2
(45) Date of Patent: Feb. 9, 2016

(54) EMERGENCY VEHICLE WARNING DEVICE AND SYSTEM

(76) Inventor: Craig David Applebaum, Nanuet, NY (US)

( * ) Notice: Subject to any disclaimer, the term of this patent is extended or adjusted under 35 U.S.C. 154(b) by 587 days.

(21) Appl. No.: 12/880,131

(22) Filed: Sep. 12, 2010

(65) Prior Publication Data
US 2011/0187559 A1     Aug. 4, 2011

Related U.S. Application Data

(60) Provisional application No. 61/300,705, filed on Feb. 2, 2010.

(51) Int. Cl.
*G08G 1/095* (2006.01)
*B60Q 1/00* (2006.01)
*G08B 21/00* (2006.01)

(52) U.S. Cl.
CPC *B60Q 1/00* (2013.01); *G08B 21/00* (2013.01); *G08G 1/095* (2013.01)

(58) Field of Classification Search
CPC .................................................. G08G 1/0965
USPC ......... 340/906, 907, 901, 902, 331, 917, 903; 244/158.4; 246/125
See application file for complete search history.

(56) References Cited

U.S. PATENT DOCUMENTS

| | | | |
|---|---|---|---|
| 3,992,656 A | 11/1976 | Joy | |
| 4,736,186 A * | 4/1988 | Jones | 340/331 |
| 4,747,064 A | 5/1988 | Johnston | |
| 4,854,527 A * | 8/1989 | Draim | 244/158.4 |
| 4,952,931 A | 8/1990 | Serageldin | |
| 5,311,197 A | 5/1994 | Sorden | |
| 5,565,874 A | 10/1996 | Rode | |
| 5,890,682 A * | 4/1999 | Welk | 246/125 |
| 5,926,113 A * | 7/1999 | Jones et al. | 340/906 |
| 5,955,968 A * | 9/1999 | Bentrott et al. | 340/906 |
| 5,977,883 A * | 11/1999 | Leonard et al. | 340/906 |
| 6,160,493 A * | 12/2000 | Smith | 340/902 |
| 6,404,351 B1 | 6/2002 | Beinke | |
| 6,417,782 B1 | 7/2002 | Darnall | |
| 6,850,169 B2 * | 2/2005 | Manavi et al. | 340/902 |

(Continued)

*Primary Examiner* — Benjamin C Lee
*Assistant Examiner* — Israel Daramola
(74) *Attorney, Agent, or Firm* — Richard Mark Blank, Esq.

(57) ABSTRACT

An emergency vehicle warning device and a vehicle warning system method for notifying a person (and plural) in a moving vehicle (and plural), an approaching emergency vehicle (and plural), including a transmitter for transmitting an emergency signal from an emergency vehicle and a receiver embedded in a siren and light vehicle warning device located near or attached to a traffic signal, and the receiving vehicle warning devise emits lights and loud siren sounds, which alert driver(s) of moving vehicle(s) and pedestrian(s), that the emergency vehicle(s) are approaching a nearby intersection; and the Emergency vehicle warning system comprising a transmitting means located in an emergency vehicle for transmitting an emergency signal indicating that the emergency vehicle(s) are approaching the intersection that is activated or starts and continues signaling when emergency vehicle(s) are on the move nearby in emergency conditions, a receiving means located in a siren and light vehicle warning device, such device located near or attached to a traffic signaling device or light, such receiving means for receiving the emergency signal from the transmitting means, and an alert means triggered by the receiving means to alert the driver of the moving vehicle(s) that the emergency vehicle(s) are approaching.

12 Claims, 8 Drawing Sheets

(56) References Cited

U.S. PATENT DOCUMENTS

| | | | |
|---|---|---|---|
| 6,958,707 B1* | 10/2005 | Siegel | 340/902 |
| 6,980,125 B1* | 12/2005 | Barber | 340/917 |
| 2003/0016143 A1* | 1/2003 | Ghazarian | 340/901 |
| 2004/0172403 A1* | 9/2004 | Steele et al. | 707/100 |
| 2005/0035878 A1* | 2/2005 | Vassilevsky | 340/902 |
| 2005/0200479 A1* | 9/2005 | James | 340/539.18 |
| 2006/0261977 A1* | 11/2006 | Bachelder | 340/906 |
| 2007/0040700 A1* | 2/2007 | Bachelder | G08G 1/0965 340/902 |
| 2008/0266136 A1* | 10/2008 | Diba | 340/906 |
| 2008/0291052 A1* | 11/2008 | Burns | 340/903 |
| 2011/0227756 A1* | 9/2011 | Otero et al. | 340/901 |

* cited by examiner

EMERGENCY VEHICLE WARNING DEVICE AND SYSTEM

"This application claims the benefit under 35 U.S.C. 119(e) of any U.S. provisional application(s) listed below. Application No. 61/300,705 Filing date Feb. 2, 2010."

FIELD OF THE INVENTION

This invention is concerned with an improvement in emergency vehicle warning to vehicle drivers approaching traffic lights and pedestrians in the vicinity, alerting drivers of moving vehicles and pedestrians located nearby of the approaching emergency vehicles and to beware of same and take evasive and precautionary action.

BACKGROUND OF THE INVENTION

While prior art as described below has disclosed many concepts for attempting to improve emergency vehicle warnings there is no stand alone separate warning device to be mounted on or near a traffic light that when activated by on coming emergency vehicles specifically emits warning alerts to the drivers of vehicles and pedestrians in the area. The main concepts found in the prior art are those that teach having the emergency vehicles themselves control traffic lights themselves through signaling them directly which have the inherit problems that the decisions how to get out of the emergency vehicle path are actually taken out of the control of the pedestrian drivers and now fully dependant on the traffic light automation which could become confused from multiple signals from multiple on coming emergency vehicles that may even becoming from different directions or different roads that intersect or both. The instructions may not be able to physically direct all vehicles in all paths correctly through the traffic light instructions. The second most common solution has been systems that have the emergency vehicles contacting the driver's vehicles directly through transmitters and receivers for individualized notification. The problems in that concept are that firstly the normal procedure is not to look down at gps or monitors when driving as you have to watch the road so deaf drivers would not be helped here and it is not a uniform solution as no one will know who was correctly notified and who does not have a device in their car or has a defective device potentially causing chaos, whereas our invention will be utilized so that when drivers look at traffic lights to determine road instructions as they are usually accustomed to do they will easily also be able to view and in most cases hear our emergency vehicle warning invention.

The Darnall Patent, U.S. Pat. No. 6,417,782 teaches a signal and an alert directly to the personal moving vehicles surrounding the emergency vehicle As stated above The problems in that concept are that firstly the normal procedure is not to look down at gps or monitors when driving as you have to watch the road so deaf drivers would not be helped here and it is not a uniform solution as no one will know who was correctly notified and who does not have a device in their car or has a defective device potentially causing chaos, whereas our invention will be utilized so that when drivers look at traffic lights to determine road instructions as they are usually accustomed to do they will easily also be able to view and in most cases hear our emergency vehicle warning invention.

Darnall also describes an existing traffic light control system as follows:

It is known that 3M Transportation Systems has a system entitled the Opticom Priority Control System or other similar title. This system provides a method of turning intersection lights green in the path of oncoming emergency vehicles, providing the safest and quickest avenue for the emergency vehicle to reach the emergency scene or medical provider. It enables the emergency vehicle driver to control the intersections by controlling the lights in the emergency vehicle's path and the lights of the cross traffic cutting across the emergency vehicle's path.

The Opticom Priority Control System basically works with three components: First, an emitter (first component) is mounted on the emergency vehicle, usually on its roof. It sends a coded optical message to the detector (second component), mounted above the traffic signal. The detector converts the optical message to an electronic impulse and sends it to the phase selector (third component) in the intersection controller cabinet. If the traffic light is already green, the phase selector tells the controller to hold the light green until the emergency vehicle passes. If the traffic light is red, the phase selector requests the controller to provide an early green traffic light, cycling through a yellow light to avoid any confusion to motorists and pedestrians. Once the emergency vehicle passes through the intersection, the system returns the traffic signal to its normal operation. Such a system has been installed in more than 35,000 intersections across the United States and Canada, and has earned a track record over years of sustained quality performance.

As stated above inherit problems that could happen with this kind of system is that the decisions how to get out of the emergency vehicle path are actually taken out of the control of the pedestrian drivers and now fully dependant on the traffic light automation which could become confused from multiple signals from multiple on coming emergency vehicles that may even becoming from different directions or different roads that intersect or both. The instructions may not be able to physically direct all vehicles in all paths correctly through the traffic light instructions.

The Sorden Patent, U.S. Pat. No. 5,311,197, teaches a vehicle location system.

The Rode Patent, U.S. Pat. No. 5,565,874, teaches an Intelligent Vehicle Highway System for controlling vehicles moving down the road and refers to issues pertaining to the Global Positioning System and infrared technology.

The Beinke Patent, U.S. Pat No. 6,404,351 teaches of a emergency vehicle warning system allowing for communication between emergency vehicles and other vehicles to warn them and also communication between emergency vehicles and traffic lights to change the traffic lights from green to red and vice versa, utilizing radio frequency transmission and reception. As discussed above our invention solves the inherent issues arising from utilizing vehicle to vehicle transmission to warn and the utilization of transmission from emergency vehicles to directly control traffic signals themselves. Also our invention teaches utilizing better and more efficient means for transmission then radio frequency as our preferred modes of transmission.

The Serageldin Patent, U.S. Pat. No. 4,952,931, teaches a signal adaptive processor and includes an algorithm, which devise is installed in vehicles to detect and recognize siren sounds from approaching vehicles. Our invention solves inherent issues arising from utilizing vehicle to vehicle transmission and detection to warn including the requirement that each motorist is equipped with such a devise, that is additionally in maintained and good working order. This invention requires an additional added cost for each motorist in purchasing the additional unit and requires proper installation. For automakers it presents new added costs and challenges as well as responsibilities. An additional task is for governments and authorities to be able to monitor who has the devise and who still needs to install one. It suggests that only some motorists will have this added protection and the technology of detection of siren sounds and recognition of them all is still not absolute and is subject to false positives and negatives.

The Johnson Patent, U.S. Pat. No. 4,747,064, teaches similar but different methods for transmission from vehicle to vehicle and transmitting measurement information so the passenger vehicle can have the data to describe accurate distances between vehicles. The invention carries similar inherent issues as Serageldin that our present invention solves which are more fully described above.

The Joy Patent, U.S. Pat. No. 3,992,656, teaches of an audio range siren detector used to control existing traffic lights which could at times be unreliable as the technology of detection of siren sounds and recognition of them all is still not absolute and is subject to false positives and negative and controlling existing traffic lights as suggested above has inherent problems and issues as described above.

BRIEF DESCRIPTION OF THE INVENTION

The current invention is concerned with the protection and safety of the drivers of vehicles on the road and their passengers when emergency vehicle(s) are approaching on their way to their emergency destinations, as well as, the protection and safety of the emergency vehicle(s) and their passengers and any pedestrian bystanders that might be located in the area or vicinity. The invention is also concerned with avoiding potential accidents and collisions with emergency vehicles, other vehicles, or bystanders, caused by the entering of emergency vehicles and non-emergency vehicles onto the same roadway approaching the same intersections and traffic lights with the emergency vehicles having a different set of rules and objectives as they speed to their emergency destinations in their pursuit of saving lives and other important assignments. Emergency vehicles include police and military vehicles, fire apparatus and vehicles, paramedic and ambulance vehicles, and other vehicles used by public officials and government workers that are in use for an emergency situation.

It benefits our society and the safety of our citizens to have all drivers of vehicles in the path of emergency vehicles help to provide a clear path for the emergency vehicle as it is approaching the emergency sight or medical facility by safely navigating their vehicles out of the path of the oncoming emergency vehicle with colliding with other vehicles or causing collisions, or accidents or injury to theirs including bystanders.

Since response time is so important when emergency vehicles are responding to or in an emergency situation, they do not always follow all of the normal traffic rules, requirements, signs, traffic signal instructions, traffic directions, usual routes, procedures, and speed limits. Drivers of vehicles unaware of an approaching emergency vehicle(s) or the immediacy of the approaching emergency vehicle(s) are at a high risk to cause or be involved in an accident as the emergency vehicle(s) approach or pass by the vehicle.

This invention will help to create a faster more efficient response time by emergency vehicles traveling under emergency situations and/or to a emergency sight or medical facility which is so important in emergency situations and cutting minutes and seconds is sometimes the difference between life and death and success or failure in the emergency matter pursuit of the emergency vehicle.

This invention reduces such danger and risk. The invention will allow for and improve the emergency vehicle's path, clearing same of vehicles and pedestrians that could otherwise block or interfere with the emergency vehicles route. Clearing the route will help to reduce any collisions and accidents involving the emergency vehicle or other drivers around the emergency vehicle.

With this objective as described the invention can be used for various applications for warning system improvement of emergency vehicle(s) approaching including protection of railroads and highways and their crossings, airport and landing fields, streetlights, buildings and other structures that emergency vehicles are approaching or are their destination. There are other objects and applications of the invention which together with the foregoing will be understood from the overall detailed specification. The specification and drawings shall be limited the inventions use in association or the vicinity of traffic signals and the corresponding intersection areas since this will be illustrative of the principals involved and other applications will be understood there from by those practiced in the arts.

Currently, most emergency vehicles are equipped with at least one type or form of transmitter and in many cases more than one that can send a signal to this invention which can be received and interpreted by the invention in order for this invention to perform by alerting drivers of vehicles, whether it's the frequency itself of the emergency vehicles sirens, or some other radio frequency transmission, or the transmission from the emergency vehicles Global Positioning System, most emergency vehicles are now equipped with a transmitting unit, the Global Positioning System (commonly and herein referred to as "GPS"). The GPS signaling unit can send a signal to invention which is positioned near or attached to a traffic signal in the emergency vehicle's path.

In the current invention, the receiver is part of the separate stand alone alert unit which is the invention here which also consisting of lights, sirens, and transmission receipt decoding equipment, which invention can be mounted directly attached to a traffic light, or the traffic light mounting braces, or the wires or poles that also has the traffic lights attached, or virtually anywhere, which invention could be programmed to receive signals from the current GPS transmissions, radio frequency transmitter, or could use an entirely different technology. Upon receiving the signal, the invention unit would activate its alert system, of either an auditory and/or visual nature (sirens and lights). Such alert would allow the drivers of vehicles time to pull out of the way of the emergency vehicles. Thus the invention will increase safety and response time to emergencies, and thereby save lives. The invention could be designed to receive multiple signals from multiple approaching emergency vehicles simultaneously and respond appropriately. The invention could have levels of alert response distinguished by differing light colors or sound frequencies or both, to indicate to the approaching vehicle drivers the distance categories of the approaching emergency vehicles.

The method for alerting person(s) in moving vehicle(s) approaching emergency vehicle(s) and pedestrians nearby comprising transmitting an emergency signal from an emergency vehicle to a separate receiver embedded in a siren and light device located near or attached to a traffic signal, and alerting driver(s) of moving vehicle(s) and pedestrians that the emergency vehicle is approaching; and the underlying process for an Emergency Alert System comprising a transmitting means located in an emergency vehicle for transmitting an emergency signal indicating that the emergency vehicle is approaching, a receiving means located in a siren and light device, located near or attached to a traffic signal, for receiving the emergency signal from the transmitting means, and an alert means triggered by the receiving means to alert the driver of the moving vehicle(s) that the emergency vehicle(s) are approaching has a number of options for possible technologies that can be utilized to achieve these results which include but are not limited to the following;

It has now been discovered that an emergency alert system may be implemented in the current invention, the receiver is part of the separate stand alone alert unit which is the invention here which also consisting of lights, sirens, and transmission receipt decoding equipment, which invention can be mounted directly attached to a traffic light, or the traffic light mounting braces, or the wires or poles that also has the traffic lights attached, or virtually anywhere, which invention could be programmed to receive signals from the current GPS transmissions, radio frequency transmitter, or could use an entirely different technology. Upon receiving the signal, the invention unit would activate its alert system, of either an auditory and/or visual nature (sirens and lights). Such alert would allow the drivers of vehicles time to pull out of the way of the emergency vehicles. Thus the invention will increase safety and response time to emergencies, and thereby save lives. The invention could be designed to receive multiple signals from multiple approaching emergency vehicles simultaneously and respond appropriately. The invention could have levels of alert response distinguished by differing light colors or sound frequencies or both, to indicate to the approaching vehicle drivers the distance categories of the approaching emergency vehicles.

The specification relates to a method for alerting person(s) in moving vehicle(s) approaching emergency vehicle(s) comprising transmitting an emergency signal from an emergency vehicle to a separate receiver embedded in a siren and light device located near or attached to a traffic signal, and alerting driver(s) of moving vehicle(s) that the emergency vehicle is approaching; and the underlying process for an Emergency Alert System comprising a transmitting means located in an emergency vehicle for transmitting an emergency signal indicating that the emergency vehicle is approaching, a receiving means located in a siren and light device, located near or attached to a traffic signal, for receiving the emergency signal from the transmitting means, and an alert means triggered by the receiving means to alert the driver of the moving vehicle(s) that the emergency vehicle(s). are approaching.

There are several objects of this invention. One object of the invention is to protect drivers, and their passengers from potential accidents and crashes between other vehicles and emergency vehicles, as well as, the prevention of pedestrians and bystanders from being hit by these vehicles. Since response time is so important when emergency vehicles are responding to or in an emergency situation, they do not always follow all of the normal traffic rules, requirements, signs, traffic signal instructions, traffic directions, usual routes, procedures, and speed limits. Drivers of vehicles unaware of an approaching emergency vehicle(s) or the immediacy of the approaching emergency vehicle(s) are at a high risk to cause or be involved in an accident as the emergency vehicle(s) approach or pass by the vehicle. This invention reduces such danger and risk. A further objective is that this invention will help to create a faster more efficient response time by emergency vehicles traveling under emergency situations and/or to a emergency sight or medical facility which is so important in emergency situations and cutting minutes and seconds is sometimes the difference between life and death and success or failure in the emergency matter pursuit of the emergency vehicle. This invention reduces such danger and risk. A further object is the invention will allow for and improve the emergency vehicle's path, clearing same of vehicles and pedestrians that could otherwise block or interfere with the emergency vehicles route. Clearing the route will help to reduce any collisions and accidents involving the emergency vehicle or other drivers around the emergency vehicle.

BRIEF DESCRIPTION OF THE DRAWINGS

The present invention will become better understood by reference to the following detailed description when considered in connection with the accompanying drawings. The drawing figures are labeled by page/sheet from one to eight and the corresponding numbers labeled on each figure are numbered from number 10 to number 70 as follows;
10 Warning Unit/Device
11 Water-Proof Housing
12 Antenna
13 Panel
14 Mounting Brackets
15 Box
16 Warning Lights
17 Water-Proof Seal
18 Warning Sirens
19 Electrical Wires
20 Power Source
21 Warning Element
22 Control Circuitry
24 Receiver
30 Transmitting Unit
32 Transmitter
34 Transmitter Antenna
36 Transmitter Power source
38 Transmitter Control Circuitry
40 Drivers and Pedestrians
42 Signal
44 Emergency vehicle with transmitting device
52 Relay Station
60 Power Lines
62 home or office
64 satellite
66 Internet
68 Cell Tower
70 Centralized Command Center

DETAILED DESCRIPTION OF THE INVENTION

Figure 1A:
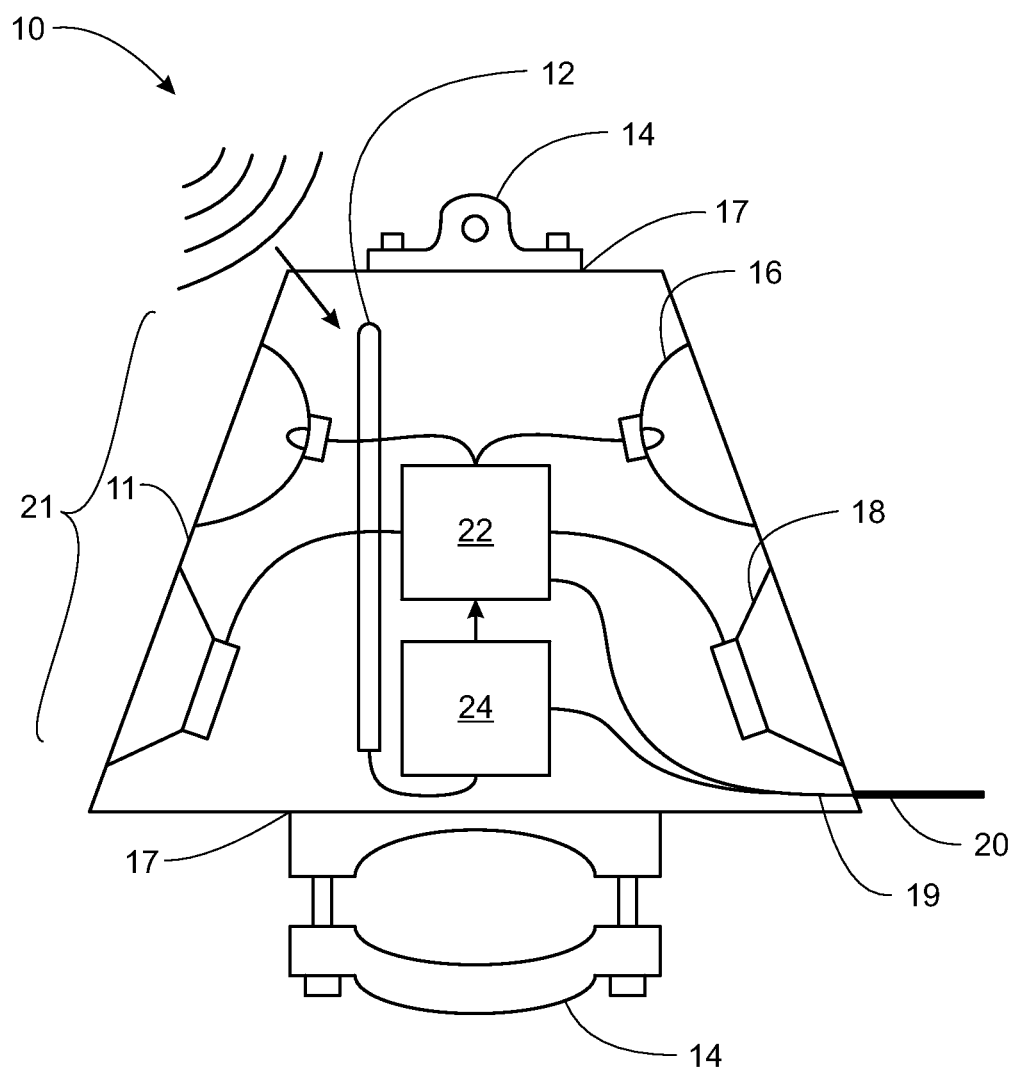
FIG. 1A presents a front view of the warning unit/devise comprising a water-proof housing with mounting brackets, wired for electricity through which electrical wires run. The housing interior containing a receiver electrically connected to an antenna, the receiver being electrically connected to the control circuitry to decode and process received signals. A warning element is affixed to the housing and is electrically connected to the output of the control circuitry. Electrical wires are electrically connected to a power supply which is electrically connected to the receiver and control circuitry to supply power to the system. The housing further having water-proof seals on all exterior mounted elements.

FIG. 1A presents a front view of the warning unit/devise 10, comprising a water-proof housing 11 with mounting brackets 14, wired for electricity through which electrical wires 19 run. The housing interior containing a receiver 24 electrically connected to an antenna 12, the receiver 24 being electrically connected to the control circuitry 22 to decode and process received signals. A warning element 21 including Warning Lights 16, and Warning Sirens 18, which is affixed to the housing 11 and is electrically connected to the output of the control circuitry 22. Electrical wires 19 are electrically connected to a power Source/power supply 20, which is electrically connected to the receiver 24, and control circuitry 22, to supply power to the system. The housing further having water-proof seals 17 on all exterior mounted elements.

Figure 1B:
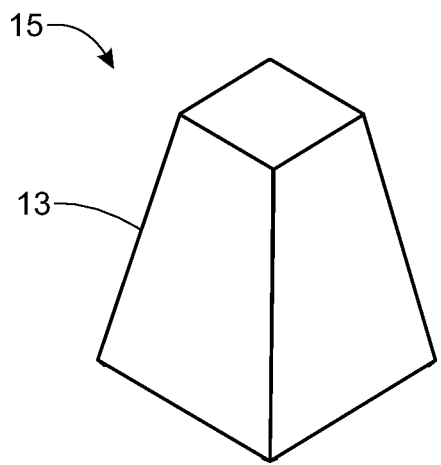
FIG. 1B depicts the six side panels of the water-proof housing including four side panels a top panel and a bottom panel which all when attached together for a box.

FIG. 1B depicts the six side panels 13 of the water-proof housing 11 including four side panels 13 a top panel 13 and a bottom panel 13 which all when attached together for a box 15.

Figure 2:
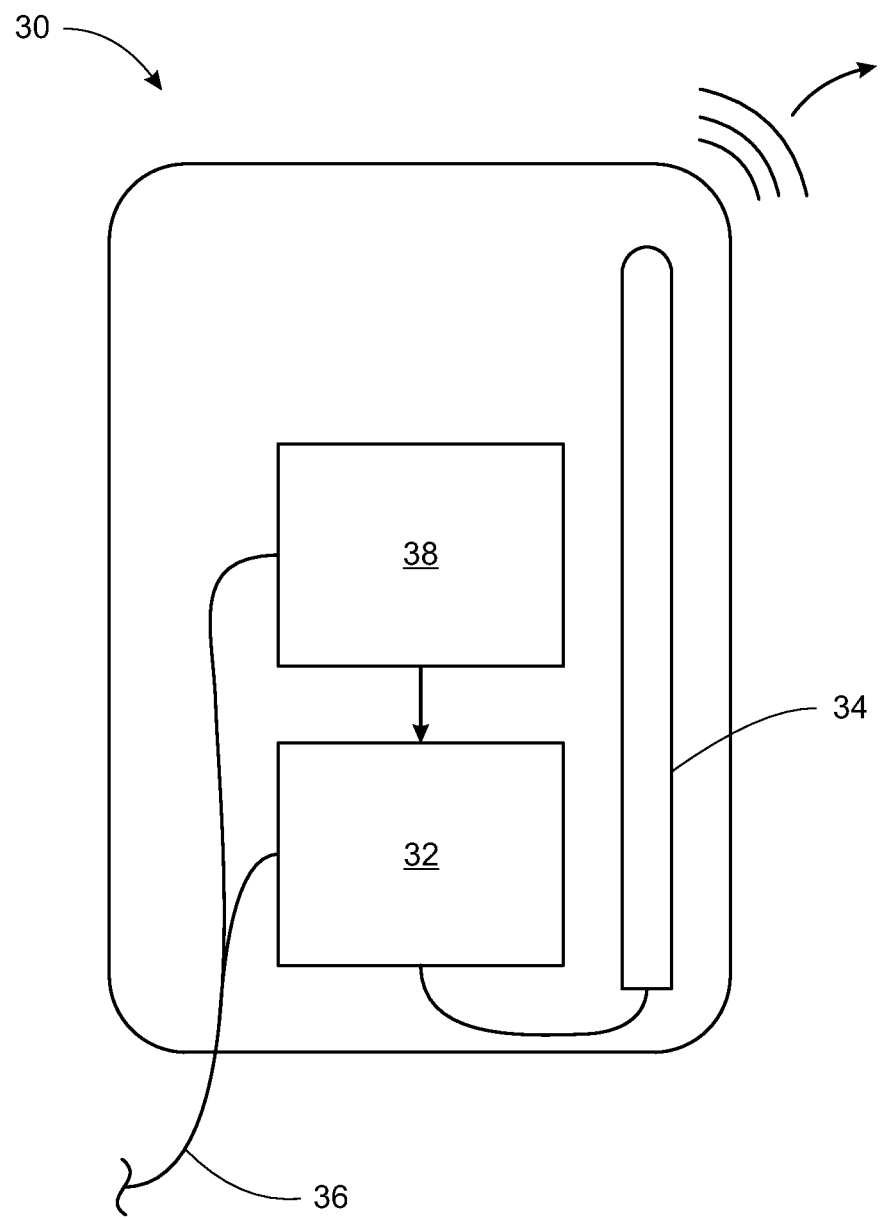
FIG. 2 presents a front view of the transmitting unit/Control Unit. The control unit with output electrically connected to a transmission antenna. The Control Unit consists of a Transmitter, Transmitter Antenna, Transmitter Power source, and Transmitter Control Circuitry.

FIG. 2 presents a front view of the transmitting unit/Control Unit, 30. The control unit with output electrically connected from a power source 36 to a transmitter antenna, 34. The Control Unit 30, consists of a Transmitter 32, Transmitter Antenna 34, Transmitter Power source 36, and Transmitter Control Circuitry 38.

Figure 3:
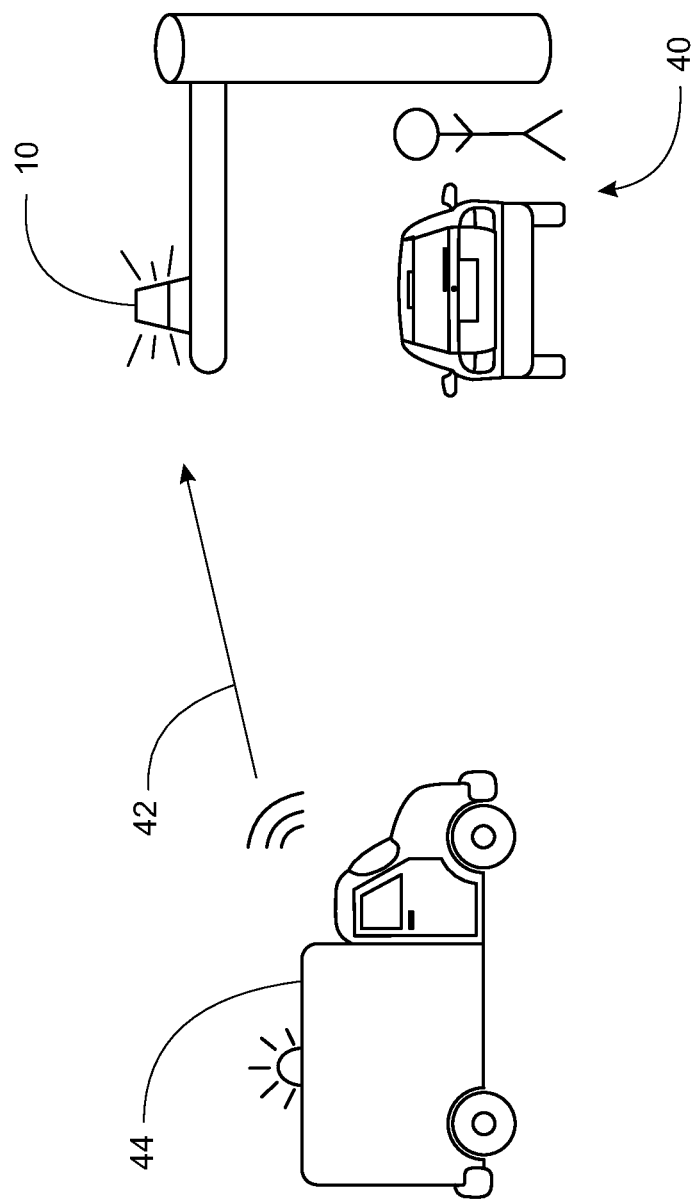
FIG. 3 is a depiction of the emergency vehicle warning system method described in claim 11 a method for notifying drivers of moving vehicle(s) and Pedestrians of emergency vehicle(s) approaching a nearby traffic intersection comprising Transmitting an emergency signal from an emergency vehicle; Receiving the emergency signal in a receiver unit which reception activates a dedicated warning unit separate from the existing lights, alerting the drivers and pedestrians at and near the traffic intersection that emergency vehicle(s) are approaching.

FIG. 3 is a depiction of the emergency vehicle warning system method described in claim 11 a method for notifying drivers of moving vehicle(s) and Pedestrians, 40, of emergency vehicle(s) with transmitting devise 44, approaching a nearby traffic intersection comprising Transmitting an emergency signal from an emergency vehicle with transmitting device 44; Receiving the emergency signal in a receiver unit 24, which reception activates a dedicated warning unit 10, separate from the existing lights, alerting the drivers and pedestrians 40, at and near the traffic intersection that emergency vehicle(s) 44, are approaching.

Figure 4:
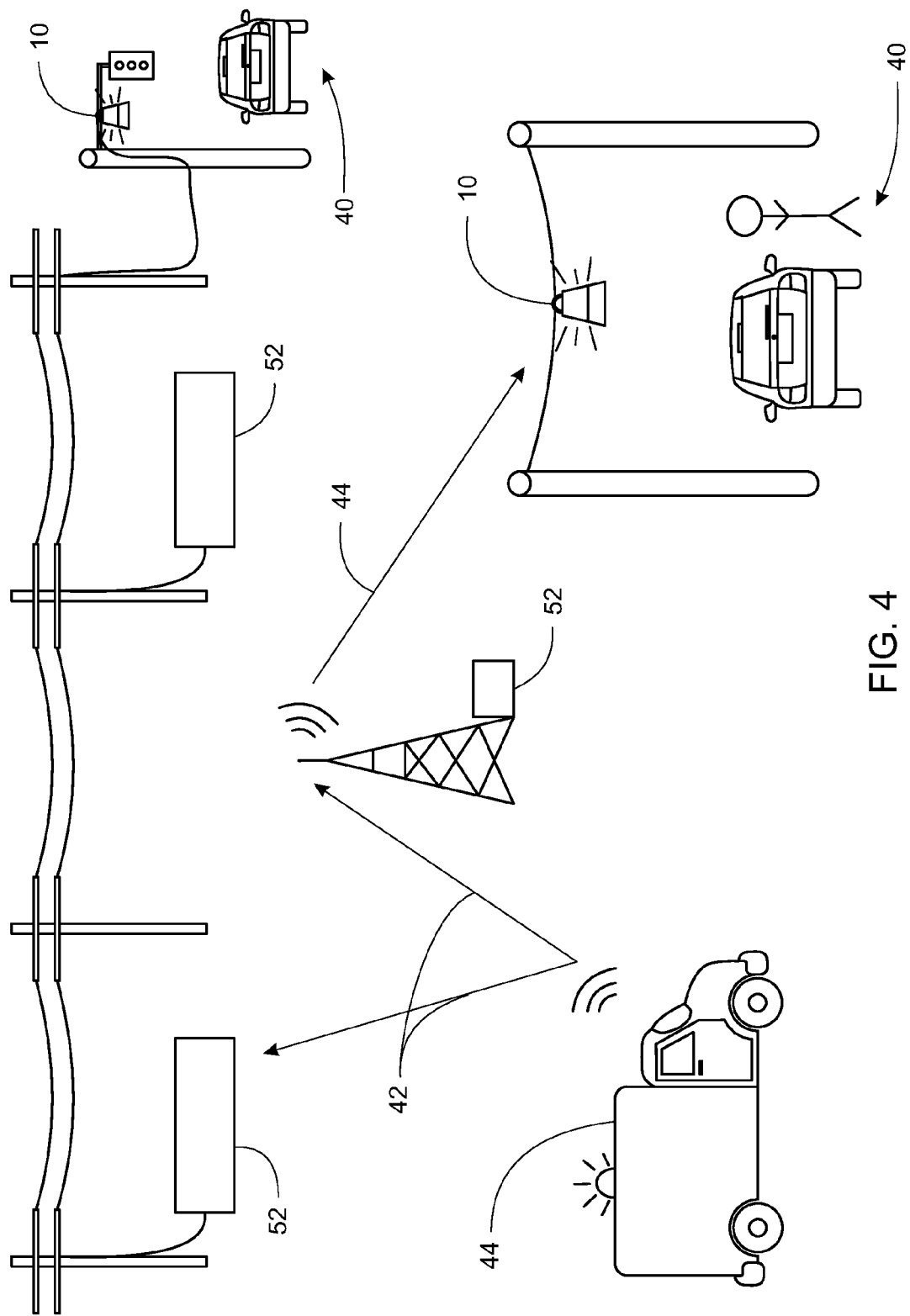
FIG. 4 is a depiction of the emergency vehicle warning system method described in claim 12 showing a method for notifying drivers of moving vehicle(s)and pedestrians of emergency vehicle(s)approaching a nearby traffic intersection comprising: transmitting a first signal from an emergency vehicle; receiving the first signal in a relay station; transmitting a second signal from the relay station; receiving the second signal in a receiving unit or additional relay stations until the signal reaches its final destination; and Once received by the designated warning unit, alerting the drivers of moving vehicles and pedestrians that the emergency vehicle(s) are approaching.

FIG. 4 is a depiction of the emergency vehicle warning system method described in claim 12 showing a method for notifying drivers of moving vehicle(s)and pedestrians 40, of emergency vehicle(s) 44, approaching a nearby traffic intersection comprising: transmitting a first signal from an emergency vehicle 44; receiving the first signal in a relay station; transmitting a second signal from the relay station 52; receiving the second signal in a receiving unit 24 or additional relay stations 52, until the signal reaches its final destination; and Once received by the designated warning unit 10, alerting the drivers of moving vehicles and pedestrians 40, that the emergency vehicle(s) 44, are approaching.

Figure 5:
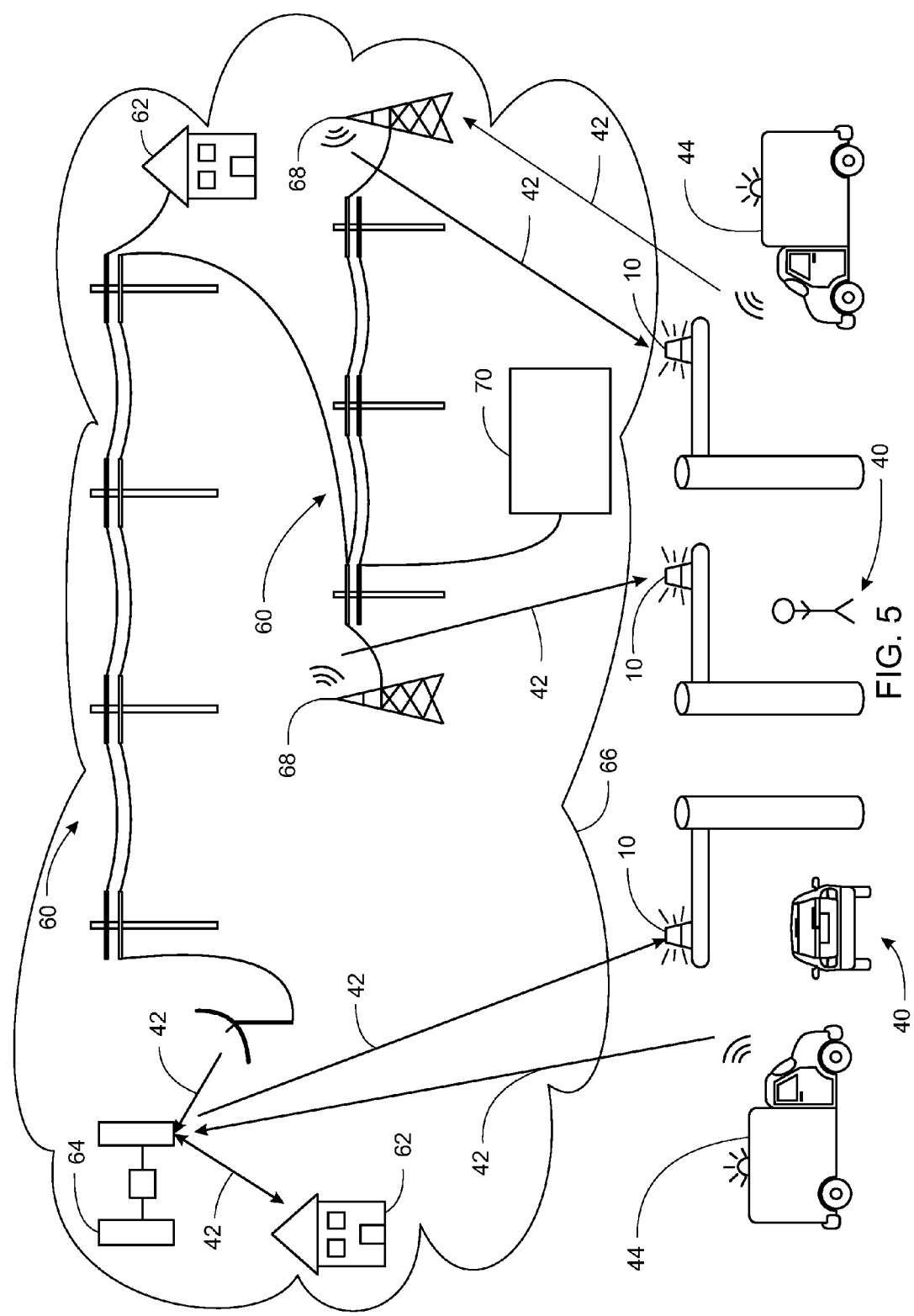
FIG. 5 is a depiction of the emergency vehicle warning system method described in claim 13 showing a method for notifying drivers of moving vehicle(s) and pedestrians of emergency vehicle(s) approaching a nearby traffic intersection comprising: transmitting a first signal from an emergency vehicle through the internet; receiving the first signal in an computer system, router, file server or other specialized programmable device as a Centralized Command Center; Processing the received signal or signals from multiple emergency vehicles and routing commands to warning units located at specific locations; transmitting a second signal from the Centralized Command Center through the internet to the designated warning units; Once received by the designated warning unit, alerting the drivers of moving vehicles and pedestrians that the emergency vehicle(s) are approaching.

FIG. 5 is a depiction of the emergency vehicle warning system method described in claim 13 showing a method for notifying drivers of moving vehicle(s) and pedestrians 40, of emergency vehicle(s) 44, approaching a nearby traffic intersection comprising: transmitting a first signal from an emergency vehicle 44 through the internet 66; to Centralized Command Center 70; Processing the received signal or signals from multiple emergency vehicles and routing commands to warning units 10, located at specific locations; the second signal from the Centralized Command Center 70, goes through the internet, to the designated warning units 10; Once received by the designated warning unit 10, alerting the drivers of moving vehicles and pedestrians 40, that the emergency vehicle(s) 44, are approaching.

Figure 6:
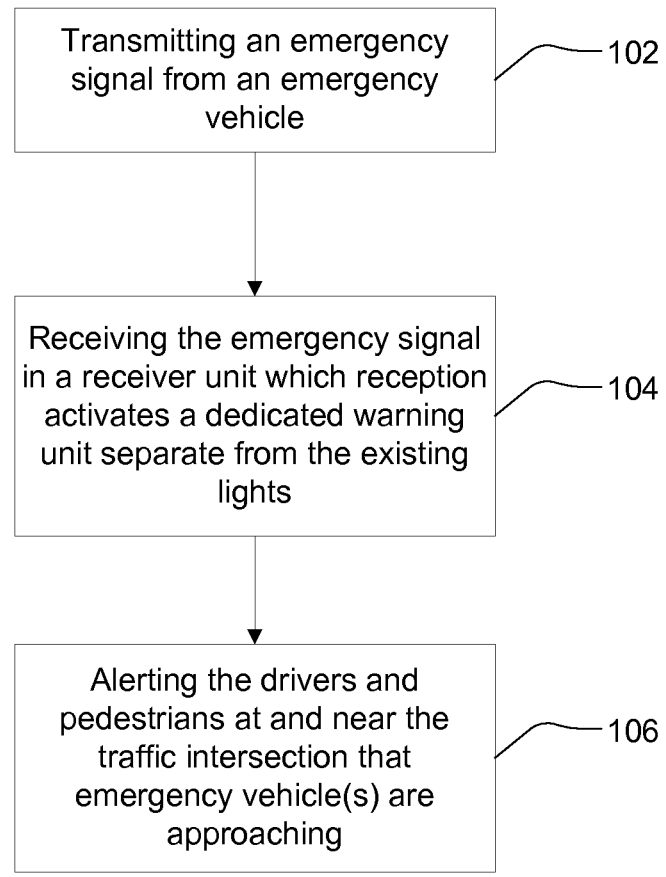
FIG. 6 is a flow chart of the emergency vehicle warning system method described in claim 11 a method for notifying drivers of moving vehicle(s) and Pedestrians of emergency vehicle(s) approaching a nearby traffic intersection comprising Transmitting an emergency signal from an emergency vehicle; Receiving the emergency signal in a receiver unit which reception activates a dedicated warning unit separate from the existing lights, alerting the drivers and pedestrians at and near the traffic intersection that emergency vehicle(s) are approaching.

FIG. 6 is a flow chart of the emergency vehicle warning system method described in claim 11 a method for notifying drivers of moving vehicle(s) and Pedestrians of emergency vehicle(s) approaching a nearby traffic intersection comprising Transmitting an emergency signal from an emergency vehicle 102; Receiving the emergency signal in a receiver unit which reception activates a dedicated warning unit separate from the existing lights 104, alerting the drivers and pedestrians at and near the traffic intersection that emergency vehicle(s) are approaching 106.

Figure 7:
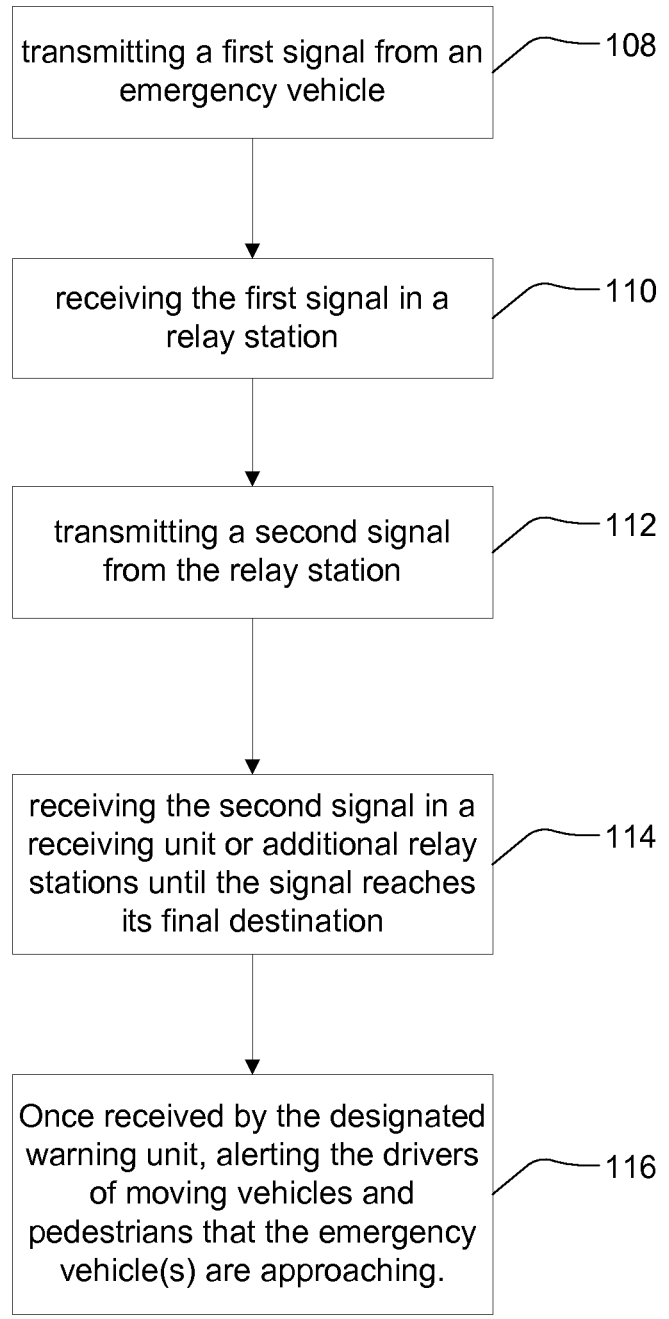
FIG. 7 is a flow chart of the emergency vehicle warning system method described in claim 12 showing a method for notifying drivers of moving vehicle(s)and pedestrians of emergency vehicle(s)approaching a nearby traffic intersection comprising: transmitting a first signal from an emergency vehicle; receiving the first signal in a relay station; transmitting a second signal from the relay station; receiving the second signal in a receiving unit or additional relay stations until the signal reaches its final destination; and Once received by the designated warning unit, alerting the drivers of moving vehicles and pedestrians that the emergency vehicle(s) are approaching.

FIG. 7 is a flow chart of the emergency vehicle warning system method described in claim 12 showing a method for notifying drivers of moving vehicle(s)and pedestrians of emergency vehicle(s)approaching a nearby traffic intersection comprising: transmitting a first signal from an emergency vehicle 108; receiving the first signal in a relay station 110; transmitting a second signal from the relay station 112; receiving the second signal in a receiving unit or additional relay stations until the signal reaches its final destination 114; and Once received by the designated warning unit, alerting the drivers of moving vehicles and pedestrians that the emergency vehicle(s) are approaching 116.

Figure 8:
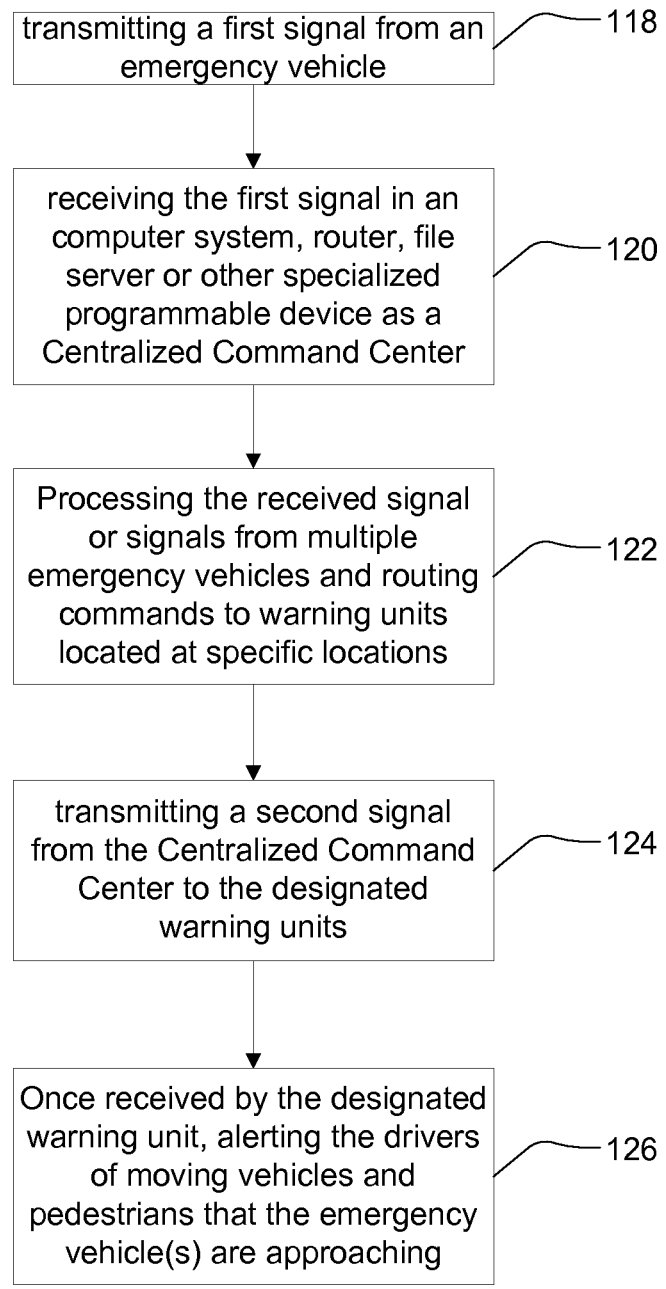
FIG. 8 is a flow chart of the emergency vehicle warning system method described in claim 13 showing a method for notifying drivers of moving vehicle(s) and pedestrians of emergency vehicle(s) approaching a nearby traffic intersection comprising: transmitting a first signal from an emergency vehicle; receiving the first signal in an computer system, router, file server or other specialized programmable device as a Centralized Command Center; Processing the received signal or signals from multiple emergency vehicles and routing commands to warning units located at specific locations; transmitting a second signal from the Centralized Command Center to the designated warning units; Once received by the designated warning unit, alerting the drivers of moving vehicles and pedestrians that the emergency vehicle(s) are approaching.

FIG. 8 is a flow chart of the emergency vehicle warning system method described in claim 13 showing a method for notifying drivers of moving vehicle(s) and pedestrians of emergency vehicle(s) approaching a nearby traffic intersection comprising: transmitting a first signal from an emergency vehicle 118; receiving the first signal in an computer system, router, file server or other specialized programmable device as a Centralized Command Center 120; Processing the received signal or signals from multiple emergency vehicles and routing commands to warning units located at specific locations 122; transmitting a second signal from the Centralized Command Center to the designated warning units 124; Once received by the designated warning unit, alerting the drivers of moving vehicles and pedestrians that the emergency vehicle(s) are approaching 126.

The method for notifying drivers of moving vehicles (plural) and (or etc.) pedestrians of emergency vehicle(s) approaching a nearby traffic intersection comprising transmitting an emergency signal from an emergency vehicle receiving the emergency signal in a receiver unit embedded in a siren and light device located near or attached to a traffic signal which reception activates the dedicated warning unit separate from the existing lights alerting the drivers and pedestrians at and near the traffic intersection that emergency vehicle(s) are approaching which method can also include within the method additional intermediate steps such as receiving the first signal in a relay station transmitting a second signal from the relay station then receiving the second signal in a receiving unit or additional relay stations until the signal reaches its final destination as is described in claim 2 or such as receiving the first signal in an computer system, router, or other specialized programmable device as a Centralized Command Center Processing the received signal or signals from multiple emergency vehicles and routing commands to warning units located at specific locations transmitting a second signal from the Centralized Command Center to the designated warning units as is described herein has a number of options for possible technologies that can be utilized to achieve these results which include but are not limited to the following.

The emergency signal(s), utilizes Global Position System Technology or other satellite navigational systems to identify the location of emergency vehicle(s) and transmitting the latitude and longitude coordinates or other data identifying the exact location of the vehicle(s) and receiving this positioning information at the warning unit, relay station, or centralized command center to trigger warning units accordingly.

The transmission and reception of the emergency signal utilizes short range RF (radio frequency) and associated transmitters, receivers, and antennas to deliver commands from the emergency vehicle directly to the warning units or control boxes attached to the warning units. The transmission and reception of the emergency signal utilizes long range RF (radio frequency) designated by the FCC for emergency broadcasts and associated transmitters, receivers, and antennas to deliver commands from the emergency vehicle directly to the warning units or control boxes attached to the warning units over greater distances.

The transmission and reception of the emergency signal utilizes digital encoding of commands RF modulated for reception by digital decoders attached directly to the warning units or control boxes attached to the warning units.

The transmission and reception of the emergency signal utilizes Wi-Fi Technologies (IEEE 802.11 Technologies) and associated transmitters, receivers, and antennas to deliver commands from the emergency vehicle directly to the warning units or control boxes attached to the warning units.

The transmission and reception of the emergency signal utilizes short range RF (radio frequency) and associated transmitters, receivers, and antennas to deliver commands from the emergency vehicle to relay stations. The transmission and reception of the signal from the first relay station is directed to next designated relay station or warning unit according to the routing commands sent from the emergency vehicle unitizing utilizes long range RF (radio frequency) designated by the FCC for emergency broadcasts or hard wired through the telephone, electric, or other utility wiring and associated transmitters, receivers, and antennas.

The transmission and reception of the emergency signal utilizes Wi-Fi Technologies (IEEE 802.11 Technologies) and associated transmitters, receivers, and antennas to deliver commands from the emergency vehicle to relay stations. The transmission and reception of the signal from the first relay station is directed to next designated relay station or warning unit according to the routing commands sent from the emergency vehicle unitizing utilizes long range RF (radio frequency) designated by the FCC for emergency broadcasts or hard wired through the telephone, electric, or other utility wiring and associated transmitters, receivers, and antennas.

The transmission and reception of the emergency signal utilizes Wi-Fi Technologies (IEEE 802.11 Technologies) and associated transmitters, receivers, and antennas to deliver commands from the emergency vehicle to relay stations connected to the internet. Emergency signals are translated into Internet Protocols and sent through the internet to file servers that process the commands and latitude and longitude coordinates or other data identifying the exact location of the vehicle(s). File servers and associated software route information collected from emergency vehicle(s) to turn on and off warning units connected to the relay network based the location of approaching emergency vehicle(s). Warning units are connected to the internet and receive commands over Internet Protocols.

The transmission and reception of the emergency signal utilizes RF (Radio Frequency) and associated transmitters, receivers, and antennas to deliver commands from the emergency vehicle to relay stations connected to the internet. Emergency signals are translated into Internet Protocols and sent through the internet to file servers that process the commands and latitude and longitude coordinates or other data identifying the exact location of the vehicle(s). File servers and associated software route information collected from emergency vehicle(s) to turn on and off warning units connected to the internet or relay stations using Internet Protocol decoders and RF transmitter, based the location of approaching emergency vehicle(s). Warning units are connected to the internet to receive commands directly from the command center or utilize RF receivers to receive commands from RF enabled relay stations.

The transmission and reception of the emergency signal utilizes 3G Wireless Technologies or other cellular telephone technologies using Internet Protocols and associated transmitters, receivers, and antennas to deliver commands from the emergency vehicle to centralized command centers hosted on internet file servers. Emergency signals and/or latitude and longitude coordinates or other data identifying the exact location of the vehicle(s) are processed by the Centralized Command Center. File servers and associated software route information collected from emergency vehicle(s) to turn on and off warning units based the location of approaching emergency vehicle(s).Warning units are connected to the internet and receive commands over Internet Protocols via 3G Wireless Technologies or other cellular telephone technologies using Internet Protocols.

The transmission and reception of the emergency signal utilizes cellular telephone technologies and associated transmitters, receivers, and antennas to deliver commands from the emergency vehicle to centralized command centers connected to the cellular network. Emergency signals and/or latitude and longitude coordinates or other data identifying the exact location of the vehicle(s) are processed by the centralized command center. Centralized command center route information collected from emergency vehicle(s) to turn on and off warning units based the location of approaching emergency vehicle(s).Warning units connected to the cellular network receive commands via cellular telephone technologies to turn off and on warning lights and sirens based on location of emergency vehicle(s).

The transmission and reception of the emergency signal utilizes Internet over satellite technologies and associated transmitters, receivers, and antennas to deliver commands from the emergency vehicle to centralized command centers connected to the cellular network. Emergency vehicle(s) utilize a Phased Array Antenna or other satellite transmission antenna to send emergency signals and/or latitude and longitude coordinates or other data identifying the exact location of the vehicle(s) to geostationary or LEO (low earth orbit) satellites using internet protocols. Satellites transmit data through the internet to a centralized command center connected to the internet. Centralized command center processes the information collected from emergency vehicle(s) and sends commands over the internet to turn on and off warning units based the location of approaching emergency vehicle(s). Warning units connected to satellite receivers receive commands via satellite over internet technologies to turn off and on warning lights and sirens based on location of emergency vehicle(s).

The transmission and reception of the emergency signal utilizes Internet over satellite technologies and associated transmitters, receivers, and antennas to deliver commands from the emergency vehicle to centralized command centers connected to the internet. Emergency vehicle(s) utilize a Phased Array Antenna or other satellite transmission antenna to send emergency signals and/or latitude and longitude coordinates or other data identifying the exact location of the vehicle(s) to geostationary or LEO (low earth orbit) satellites using internet protocols. Satellites transmit data through the internet to a centralized command center connected to the internet. Centralized command center processes the information collected from emergency vehicle(s) and sends commands over the internet to turn on and off warning units based the location of approaching emergency vehicle(s). Warning units connected to satellite receivers receive commands via satellite over internet technologies to turn off and on warning lights and sirens based on location of emergency vehicle(s).

The transmission and reception of the emergency signal utilizes satellite technologies and associated transmitters, receivers, and antennas to deliver commands from the emergency vehicle to centralized command centers connected to the satellite network. Emergency vehicle(s) utilize a Phased Array Antenna or other satellite transmission antenna to send emergency signals and/or latitude and longitude coordinates or other data identifying the exact location of the vehicle(s) to geostationary or LEO (low earth orbit) satellites.

Satellites transmit data directly to a centralized command center utilizing satellite receivers and transmitters or connected to a terrestrial satellite uplink facility. Centralized command center processes the information collected from emergency vehicle(s) and uplink commands to satellites to turn on and off warning units based the location of approaching emergency vehicle(s). Warning units connected to satellite receivers receive commands relayed from the satellites to turn off and on warning lights and sirens based on location of emergency vehicle(s).

The transmission and reception of the emergency signal utilizes satellite technologies and associated transmitters, receivers, and antennas to deliver commands from the emergency vehicle to a satellite. Emergency vehicle(s) utilize a Phased Array Antenna or other satellite transmission antenna to send emergency signals and/or latitude and longitude coordinates or other data identifying the exact location of the vehicle(s) to geostationary or LEO (low earth orbit) satellites. Satellites relay data to all warning units utilizing satellite receivers. Waning units process the information collected from any and all emergency vehicles turn on and off warning signals based the location emergency vehicle(s) near the specific vehicle that an E911-capable phone can give your wireless carrier continual updates on your location. The phone is embedded with a Global Positioning System chip, which can calculate your coordinates to within a few yards by receiving signals from satellites.

An E911-capable (Global Positioning System chip) device is utilized in the emergency vehicle(s) to continually and automatically update the location of the emergency vehicle(s) when the vehicle siren is activated. Transmitter continuously sends signals to receivers enabling them to keep track of each emergency vehicle in real-time.

Specialized GPS Navigation device is utilized in the emergency vehicle to manage the warning units. GPS device utilizes specialized software to track warning units along path to destination and allow for automatic or manual driver activation of specific warning signals at specific intersections. GPS device tracks other emergency vehicles, passenger vehicles and pedestrians along their route using information collected from passenger vehicle GPS's, pedestrians carrying E911-capable cell phones (Global Positioning System chip embedded in cell phone), and/or traffic monitoring systems available through third parties.

Emergency vehicle(s) continuously transmit signal to turn on any/all warning units that utilize the system's receivers. Warning units are activated when the vehicle is within reception range of the specific warning unit. The range of activation can be fixed or varied by turning up or down the power output f the vehicle transmitter.

All information from every emergency vehicle and warning system is transmitted or collected for use in a remote monitoring system. Remote monitoring system enables emergency vehicle dispatchers and other non-vehicle emergency personnel to monitor all warning systems and vehicles to ensure proper operation. Remote monitors allow for activation or deactivation of warning signals from any authorized monitor as a secondary backup to the drivers.

Alerting the driver is accomplished by an Auditory Alert, including the sounding of an additional Auditory siren, and is also accomplished by a Visual Alert, including the lighting and flashing of an additional visual lighting device, and the lighting of an additional Visual Display solely for the purpose of alerting the drivers of personal vehicles and pedestrians and drivers of approaching emergency vehicles.

The transmission and reception of the emergency signal utilizes Blackberry and associated cellular telephone technologies and associated transmitters, receivers, and antennas to push commands from the emergency vehicle to centralized command centers connected to the Blackberry network. Emergency signals and/or latitude and longitude coordinates or other data identifying the exact location of the vehicle(s) are processed by the centralized command center. Centralized command center routes information collected from emergency vehicle(s) to turn on and off warning units based the location of approaching emergency vehicle(s). Warning units connected to the Blackberry network receive commands via Blackberry technologies to turn off and on warning lights and sirens based on location of emergency vehicle(s). The control unit for initializing the emergency signal can be a dedicated device or a personal computer with the appropriate software.

This invention is concerned with an improvement in emergency vehicle warning to vehicle drivers approaching traffic lights and pedestrians in the vicinity, alerting drivers of moving vehicles and pedestrians located nearby of the approaching emergency vehicles and to beware of same and take evasive and precautionary action.

A new and improved emergency vehicle warning device comprising, in combination: An intersection of at least two roads with a plurality of traffic lights for directing traffic and/or an intersection of at least two roads with electrical utility or other electrified pole there through;

A water-proof housing having six panels to enclose a box like structure thus defining an interior space, the housing mounted to a pole wired for electricity be it a traffic light pole, electrical utility pole, or other pole through which electrical wires run. In one embodiment the shape of the bow will be round, square, rectangle or hexagonal. The housing interior containing a receiver electrically connected to an internal or external antenna or directly to transmission wires, the receiver being electrically connected to the control circuitry to decode and process received signals. Warning lights and sirens can affixed to the interior or exterior of the housing and are electrically connected to the output of the control circuitry. Electrical wires are electrically connected to a power supply located in the interior of the housing and electrically connected to receiver and control circuitry to supply power to the system. An unobstructed panel being one to which no additional elements or mounting hardware are connected, hinged to the adjoining panel(s) and having a key actuated lock for allowing access to the interior space by authorized personnel, the housing further having water-proof seals on access panel and all exterior mounted elements.

control unit located within an emergency vehicle to automatically or manually activate single or multiple warning units at or near an intersection or intersections along the route to the destination. Control unit consisting of existing smart phones, computer, computerized device, or transmitter or customized control unit. Customized control unit encased within a box containing control circuitry coupled within the interior space thereof, with output electrically connected to a transmission antenna. Control unit contains two inputs whereas first input of the control unit is electrically connected to the emergency vehicle(s) siren or command controls and second input of the control unit is electrically connected to an internal or external GPS device. Command controls consisting of push buttons or graphically designed computer interface or other switching mechanism to send commands to specific or multiple warning units for activation and/or automatic activation of warning units based on GPS position or proximity to warning units with commands initiated by activation of emergency vehicle sirens.

Some of the many alternatives to the structure and design of the unit include that the water-proof housing having six panels which form a box which can alternatively be simply a round shaped housing, oval shaped housing, a square shaped housing, a rectangle shaped housing, or any geometrically shaped housing. The pole wired for electricity can be a traffic light pole, an electrical utility pole, utility wires, or any other structure which also houses or has mounted a traffic device. The warning element that is affixed to the housing can consist of lights, consists of sirens, or consists of lights and sirens and can be affixed to the interior of the housing, or exterior of the housing. The power supply can be located in the interior of the housing, or exterior. The water proof housing can be an unobstructed panel being one to which no additional elements or mounting hardware are connected, hinged to the adjoining panel(s) and having a key actuated lock for allowing access to the interior space by authorized personnel, the housing further having water-proof seals on access panel. The new and improved emergency vehicle warning device can include a control unit to activate warning unit at or near an intersection or intersections along the route to the destination. The control unit with output electrically connected to a transmission antenna. The control unit can also be located in an emergency vehicle. Another option is the control unit also can be automatically activate warning units at or near an intersection or intersections along the route to the destination. Another option is that the control unit can manually activate warning units at or near an intersection or intersections along the route to the destination. The intersection warning unit being controlled can be multiple warning units. The Control unit can even consist of existing smart phones, or an existing computer, or any existing computerized device, or an existing transmitter, or be a customized control unit. The customized control unit can be encased within a box containing control circuitry coupled within the interior space thereof. The Control unit can contain an input whereas input of the control unit is electrically connected an emergency vehicle(s) siren. The control unit can contain an input whereas input of the control unit is electrically connected to an emergency vehicle(s) command control. The Control unit can contain two inputs whereas first input of the control unit is electrically connected to the emergency vehicle(s) siren and second input of the control unit is electrically connected to a GPS device. The Control unit can contain two inputs whereas first input of the control unit is electrically connected to the emergency vehicle(s) command controls and second input of the control unit is electrically connected to an internal or external GPS device. The control unit command controls can consist of push buttons to send commands to warning units for activation of warning units based on GPS position to warning units with commands initiated by activation of emergency vehicle sirens. The Command controls can consist of graphically designed computer interface to send commands to warning units for activation of warning units based on GPS position to warning units with commands initiated by activation of emergency vehicle sirens. The command controls can consist of a switching mechanism to send commands to warning units for activation of warning units based on GPS position to warning units with commands initiated by activation of emergency vehicle sirens.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed:

1. An emergency vehicle warning device comprising:
   a transmitter in an emergency vehicle comprising a GPS navigation unit to manage and track warning units along a route of the emergency vehicle and to transmit warning signals by means of low Earth orbiting satellites to specific warning units at specific intersections along the route;
   a receiver at each of the warning units electrically connected to an antenna, the receiver being electrically connected to a control circuitry to receive warning signals, which are transmitted by the emergency vehicle using low Earth orbit satellites, and decode and process received signals; and
   a warning element affixed to the exterior of a water-proof housing of each warning unit and electrically connected to an output of the control circuitry;
   wherein the warning element of each warning unit, when receiving the transmitted warning signals specified by the emergency vehicle, activate differing light colors or sound frequencies or both, to indicate to approaching vehicle drives the distance categories of the approaching emergency vehicle.

2. The device of claim 1, wherein the antenna is internal.

3. The device of claim 1, wherein the antenna is external.

4. The device of claim 1, wherein the antenna is actually connected directly to a transmission wire.

5. The device of claim 1, wherein the warning device additionally comprises a control unit to remotely activate the warning unit.

6. The device of claim 5, wherein the control unit automatically activates the warning device.

7. The device of claim 5, wherein the warning device is connected to an internal or an external GPS device.

8. The device of claim 7, wherein the GPS device is used to locate and activate the warning device.

9. A method for notifying drivers of moving vehicles or pedestrians of an emergency vehicle approaching a nearby traffic intersection comprising:
   transmitting an emergency signal using low Earth orbit satellites [using a transmitter in the emergency vehicle comprising a GPS navigation unit to manage and track warning units along a route of the emergency vehicle, to specific warning units at specific intersections along the route];
   receiving the emergency signal in a receiver unit [of each of the warning units specified by the emergency vehicle] using low Earth orbit satellites;
   each receiver unit of the warning unit specified by the emergency vehicle activates a dedicated warning element which alerts the drivers or the pedestrians at the nearby traffic intersection of each specified warning unit that the emergency vehicle is approaching;
   wherein the warning element of each warning unit, when receiving the transmitted warning signals specified by the emergency vehicle, activate differing light colors or sound frequencies or both, to indicate to approaching vehicle drives the distance categories of the approaching emergency vehicle.

10. The method of claim 9, wherein the emergency signal is routed through a relay station before reaching the receiver.

11. The method of claim 9, wherein the alert is a siren or a lighting system.

12. The method of claim 9, wherein the emergency signal originates from an emergency vehicle or a central command location.

* * * * *